(12) United States Patent
Kowalewski

(10) Patent No.: US 8,832,189 B2
(45) Date of Patent: Sep. 9, 2014

(54) METHOD AND APPARATUS FOR REQUESTING MEDIA REPLICATION IN A COLLABORATIVE COMMUNICATION SESSION, AND METHOD AND APPARATUS FOR ASSIGNING A COMMUNICATION MEDIUM FOR A COLLABORATIVE COMMUNICATION SESSION

(75) Inventor: Frank Kowalewski, Goettingen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 530 days.

(21) Appl. No.: 13/117,213

(22) Filed: May 27, 2011

(65) Prior Publication Data

US 2011/0295954 A1 Dec. 1, 2011

Related U.S. Application Data

(60) Provisional application No. 61/348,754, filed on May 27, 2010.

(30) Foreign Application Priority Data

May 27, 2010 (DE) .......................... 10 2010 021 770

(51) Int. Cl.
*G06F 15/16* (2006.01)
*H04L 12/18* (2006.01)

(52) U.S. Cl.
CPC .................................. *H04L 12/1827* (2013.01)
USPC ............ 709/204; 709/205; 709/206; 709/207

(58) Field of Classification Search
CPC ..... H04N 7/15; H04N 7/152; H04N 21/4788; H04L 12/1813; H04L 12/1822; H04L 12/581; H04L 12/1818; H04L 12/1827; H04L 29/06; H04L 51/04; H04L 65/403; H04L 67/14; H04M 3/567; H04M 2203/5063; H04M 2203/5018; H04M 7/0027; G06F 2221/2141
USPC ......................................... 709/204–207, 231
See application file for complete search history.

(56) References Cited

U.S. PATENT DOCUMENTS

| 5,195,086 A | 3/1993 | Baumgartner et al. |
| 2002/0075304 A1* | 6/2002 | Thompson et al. ........... 345/751 |

(Continued)

FOREIGN PATENT DOCUMENTS

| DE | 102004053597 A1 | 5/2006 |
| DE | 102005001886 A1 | 7/2006 |

(Continued)

OTHER PUBLICATIONS

English abstract for DE 102009013411A1.

(Continued)

*Primary Examiner* — Alina N Boutah
(74) *Attorney, Agent, or Firm* — Schwabe Williamson & Wyatt, P.C.

(57) ABSTRACT

Method and apparatus for requesting media replication in a collaborative communication session, and Method and apparatus for assigning a communication medium for a collaborative communication session. In a method for requesting media replication in a collaborative communication session, a message is sent which specifies that a communication medium for a collaborative communication session, which is currently being transmitted to at least one terminal, should additionally be transmitted to at least one other terminal, with the at least one other terminal being indicated in the message as the recipient of the communication medium. In a method for assigning a communication medium for a collaborative communication session, a corresponding message is received, and the communication medium is assigned to the at least one other terminal as the recipient of the communication medium. The methods are carried out by appropriately designed apparatuses.

14 Claims, 5 Drawing Sheets

(56) References Cited

U.S. PATENT DOCUMENTS

| | | | |
|---|---|---|---|
| 2002/0167921 A1* | 11/2002 | Vakil et al. | 370/331 |
| 2003/0153339 A1* | 8/2003 | Crockett et al. | 455/518 |
| 2004/0239754 A1* | 12/2004 | Shachar et al. | 348/14.08 |
| 2005/0004982 A1* | 1/2005 | Vernon et al. | 709/204 |
| 2006/0070003 A1* | 3/2006 | Thompson et al. | 715/758 |
| 2007/0097886 A1 | 5/2007 | Schwagmann et al. | |
| 2007/0136422 A1* | 6/2007 | Ohtani et al. | 709/204 |
| 2007/0189203 A1* | 8/2007 | Sung et al. | 370/328 |
| 2007/0198647 A1* | 8/2007 | Lingafelt et al. | 709/207 |
| 2008/0155106 A1* | 6/2008 | Hans et al. | 709/227 |
| 2009/0006980 A1* | 1/2009 | Hawley et al. | 715/752 |
| 2010/0205537 A1* | 8/2010 | Knighton et al. | 715/751 |
| 2010/0287251 A1* | 11/2010 | Mahdi | 709/206 |
| 2010/0312841 A1* | 12/2010 | Doken et al. | 709/206 |
| 2011/0040836 A1* | 2/2011 | Allen et al. | 709/205 |
| 2011/0116473 A1* | 5/2011 | Shaheen et al. | 370/331 |
| 2011/0161508 A1* | 6/2011 | Kim et al. | 709/228 |
| 2011/0196973 A1* | 8/2011 | Shaheen et al. | 709/228 |
| 2011/0289148 A1* | 11/2011 | Kowalewski | 709/205 |
| 2012/0072503 A1* | 3/2012 | Kowalewski | 709/206 |
| 2012/0072504 A1* | 3/2012 | Kowalewski | 709/206 |
| 2012/0084388 A1* | 4/2012 | De Foy et al. | 709/217 |
| 2013/0041954 A1* | 2/2013 | Kim et al. | 709/204 |

FOREIGN PATENT DOCUMENTS

| | | | |
|---|---|---|---|
| DE | 102005016587 A1 | 10/2006 | |
| DE | 102009013411 A1 | 10/2010 | |
| DE | 102010017925 A1 | 10/2011 | |
| WO | 2010081146 A2 | 7/2010 | |

OTHER PUBLICATIONS

English abstract for DE 102005001886A1.

English language machine translation of DE 10 2010 017 925.6.

3GPP TS 23.237 V9.2.0 (Sep. 2009) 3rd Generation Partnership Project; Technical Specification Group Services ans Architecture; IP Multimedia Subsystem (IMS) Service Continuity; Stage 2 (Release 9); pp. 1-88.

Network Working Group Request for Comments: 3261 "SIP: Session Initiation Protocol" J. Rosenberg et al. Jun. 2002; pp. 1-270.

Network Working Group Request for Comments: 3515 "The Session Initiation Protocol (SIP) Refer Method" R. Sparks Apr. 2003; pp. 1-23.

3GPP TS24.237 V9.1.0 (Dec. 2009) 3rd Generation Partnership Project; Technical Specification Group Core Network and Terminal; IP Multimedia (IM) Core Network (CN) subsystem IP Multimedia Subsystem (IMS) Service Continuity; Stage 3 (Release 9); pp. 1-176.

Network Working Group Request for Comments: 2327 "SDP: Session Description Protocol" Handley et al. Apr. 1998; pp. 1-43.

Network Working Group Request for Comments: 4574 "The Session Description Protocol (SDP) Label Attribute" O. Levin et al. Aug. 2006; pp. 1-9.

Network Working Group Internet-Draft (http://tools.ietf.org/id/draft-lamparter-sipping-session-duplication-00.txt) "Duplicate a SIP session" P. Imai et al. Dec. 19, 2007; pp. 1-14.

* cited by examiner

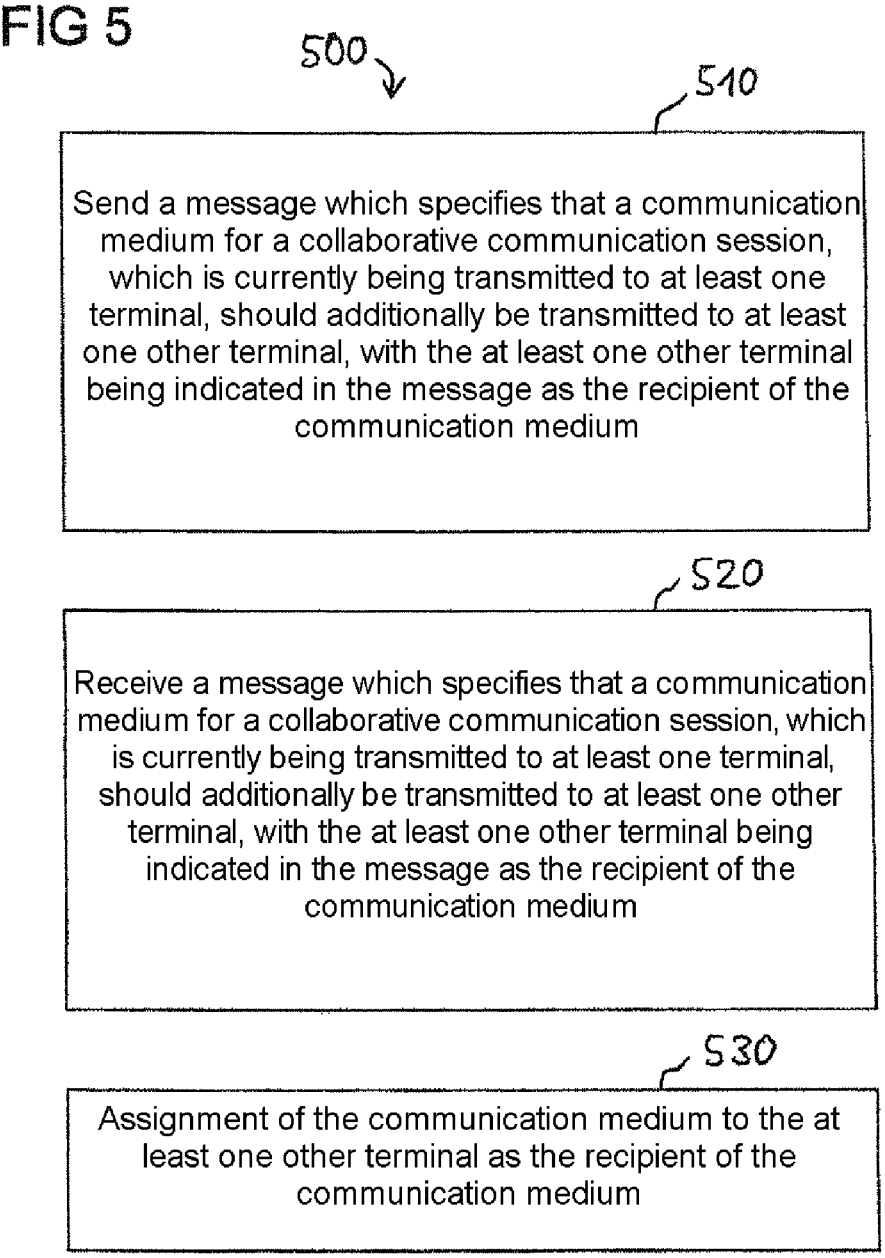

METHOD AND APPARATUS FOR REQUESTING MEDIA REPLICATION IN A COLLABORATIVE COMMUNICATION SESSION, AND METHOD AND APPARATUS FOR ASSIGNING A COMMUNICATION MEDIUM FOR A COLLABORATIVE COMMUNICATION SESSION

CROSS-REFERENCE TO RELATED APPLICATION

This application claims priority to German Patent Application Serial No. 10 2010 021 770.0, which was filed May 27, 2010, and is incorporated herein by reference in its entirety. Furthermore, this application claims the benefit of U.S. Provisional Patent Application Ser. No. 61/348,754, which was filed May 27, 2010, and is incorporated herein by reference in its entirety.

TECHNICAL FIELD

Various embodiments relate to a method and an apparatus for requesting media replication in a collaborative communication session, and to a method and an apparatus for assigning a communication medium for a collaborative communication session.

BACKGROUND

Communication by technical means between a specific, finite number of subscribers is referred to as a communication session. A collaborative communication session is the process of communicating using a plurality of communication terminals (also referred to for short in the following text as terminals) for a single one of the communication ends. In other words, at least one of the communication ends (that is to say one of the subscribers) uses a plurality of terminals in order to communicate with at least one other communication end. A terminal at one communication end controls the collaborative session, for example by defining which communication media (for example audio, video, text, etc.) should be transmitted to which terminals in the collaborative session, and it therefore intrinsically has a so-called control role.

In order to allow the functions of controlling terminals in a collaborative communication session precisely for that controlling terminal (and in particular not to allow them for the non-controlling terminals), it is necessary to be able to allocate (or in other words: assign) the control role for one terminal in the communication system.

It is known from the document "3GPP Technical Specification TS23.237, V9.2.0, IP Multimedia Subsystem (IMS) Service Continuity; Stage 2" that collaborative communication sessions (collaborative sessions) can be carried out using a communication system which is designed on the basis of the Internet Protocol Multimedia Subsystem (IMS) of the 3GPP mobile radio standard.

In collaborative communication sessions in the IMS, one user with a plurality of terminals is registered with the IMS. The collaborative session is set up by one of the terminals requesting the IMS to transfer one of its communication media to another terminal of the user. This means that, after the media transfer, the medium is no longer received by that communication terminal but by the other communication terminal. In this case, the terminal requesting this media transfer is assigned the control role for the collaborative session.

Only one holder of the control role can subsequently control the collaborative session and, for example, carry out further media transfers. In the case of IMS collaborative communication sessions, the control role is always assigned to that terminal which requests the first media transfer.

SUMMARY

In a method for requesting media replication in a collaborative communication session, a message is sent which specifies that a communication medium for a collaborative communication session, which is currently being transmitted to at least one terminal, should additionally be transmitted to at least one other terminal, with the at least one other terminal being indicated in the message as the recipient of the communication medium.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flowchart illustrating a method for requesting media replication in a collaborative session, and a method for assigning a communication medium for a collaborative session according to various embodiments.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments allow a collaborative session to be controlled in a more flexible manner For the purposes of this description, the terms "linked", "connected" and "coupled" are used to describe both a direct and an indirect link, a direct or an indirect connection and a direct or indirect coupling. Identical or similar elements are provided with identical reference symbols in the figures, where this is expedient.

In various embodiments, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Embodiment 1

A communication system is considered, which is based on the Internet Protocol Multimedia Subsystem (IMS) to the 3GPP mobile radio standard.

Figure 1:
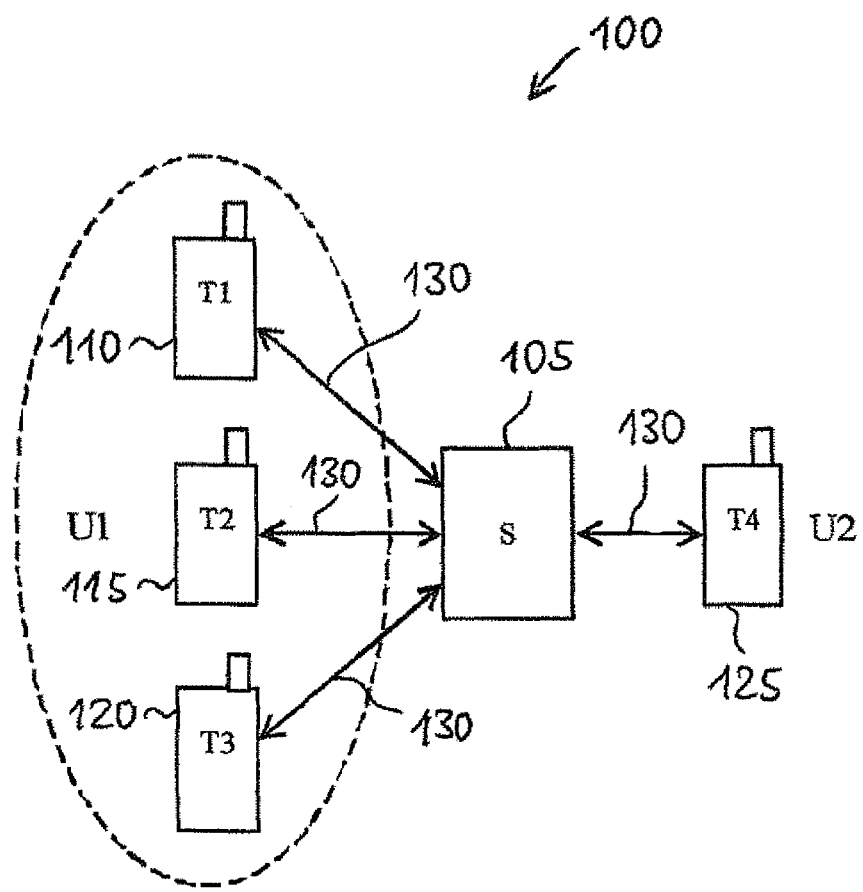
FIG. 1 shows an architecture, illustrated in a simplified form, of an IMS-based communication system.

FIG. 1 shows an architecture, illustrated in a simplified form, of an IMS-based communication system 100.

The communication system 100 may include or consist of terminals and servers, to which the terminals are connected. In order to simplify the illustration, all of the relevant servers are referred to in a summarized form as IMS servers 105 (S, server) in the following text. In real systems, the IMS contains a multiplicity of servers with specific functionalities, for example a call session control function server, an application server, etc.

In the example, three communication terminals T1 110, T2 115 and T3 120 are associated with one user U1. A further terminal T4 125 is associated with the user U2. All of the terminals are connected to the IMS server 105 and are registered with the server 105, as is symbolized by double-headed arrows 130.

The communication control in IMS is set up using the Session Initiation Protocol (SIP). An SIP REFER message, that is to say a message of the REFER message type, may be used by one communication appliance to request communication session control messages for another communication appliance. In IMS collaborative sessions, SIP REFER messages are used in order to transfer media transmission from one terminal to another terminal.

Figure 2:
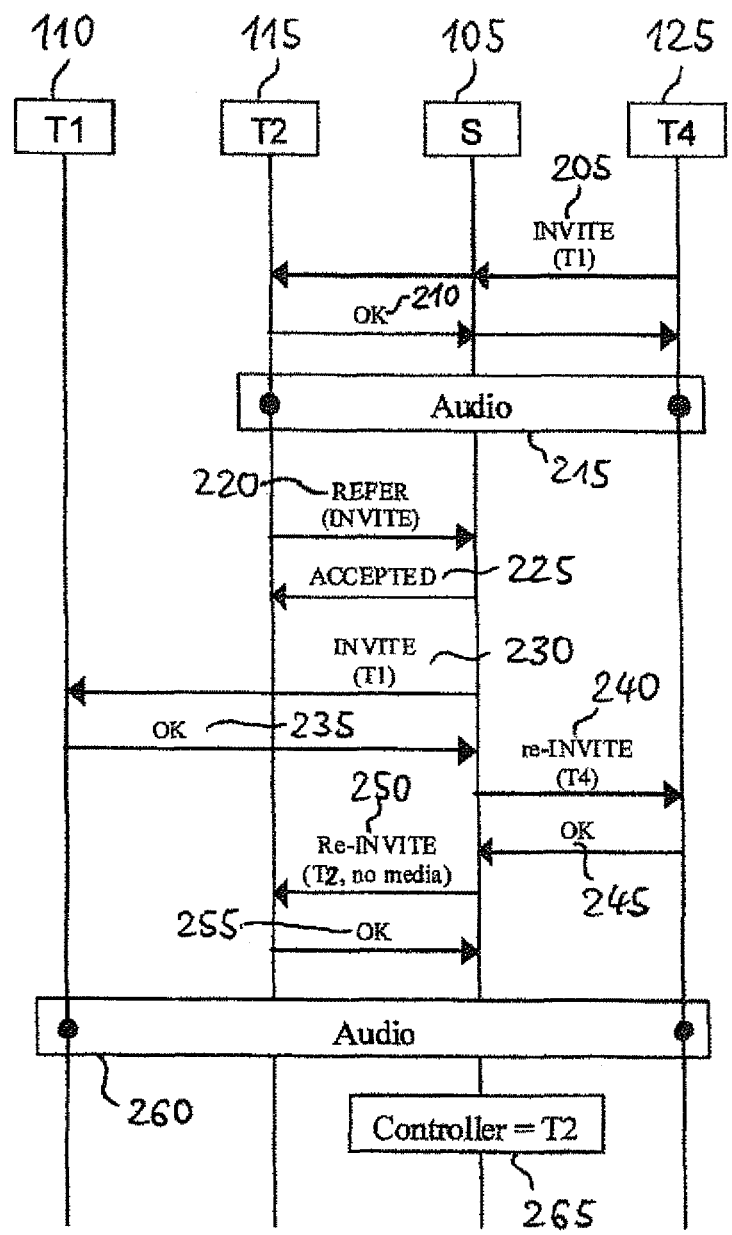
FIG. 2 shows a message flowchart, illustrating the message flow for media transfer within a collaborative session.

FIG. 2 shows a message flowchart, illustrating the message flow for media transfer within a collaborative session in the IMS-based communication system 100 as shown in FIG. 1.

The user U2 uses his terminal T4 125 to call the terminal T2 115 of user U1 by means of the SIP INVITE message 205, of the INVITE message type. U1 accepts the call with his terminal T2 115, and T2 115 confirms the acceptance by means of the confirmation message OK 210. T2 is a mobile telephone. Subsequently U1 arrives at home, where he wishes to take part in a call with his wife. U1 wishes to make the call using the stationary appliance T1 110 (for example a computer) and therefore transfers the audio data for communication with T4 125 from his mobile telephone T2 115 (previous audio connection 215 between T2 and T4) to his computer T1 110.

T2 115 uses an SIP REFER message 220 to request the transfer of the media data from T2 115 to T1 110. The SIP REFER message 220 which is sent may appear as shown in the following Table 1 (the table shows only a small number of message fields which are relevant for the explanation in conjunction with various embodiments):

| Request-URI SIP HEADERS | S |
|---|---|
| To: | S |
| From: | T2 |
| Refer-to: | T1; method=INVITE |
| Contact: | T2 |

In this case, S is the SIP address of the IMS server 105, which is in this case stated in the form of an Internet address, that is to say a Uniform Resource Identifier (URI). T1 and T2 are the SIP addresses of the subscriber terminals T1 110 and T2 115, respectively.

The server 105 uses the message ACCEPTED 225 to accept the media transfer request. The server 105 now uses the INVITE message 230 to invite T1 110 to join the audio communication, and T1 110 confirms this by the confirmation message OK 235. The server 105 then uses the re-INVITE message 240 to inform T4 125 about the new audio connection and T4 125 confirms this by means of the confirmation message OK 245. Finally, the server 105 uses the re-INVITE message 250 to inform T2 115 of the completion of the media transfer, that is to say the original invitation to T2 is now changed to an invitation without a media connection "no media", and T2 115 confirms this by means of the confirmation message OK 255.

The request for the media transfer by the terminal T2 115 results in a collaborative session with a new audio connection 260 between T1 110 and T4 125. "Controller=T2" 265 is used to assign the control role for the collaborative session to T2 115. By way of example, this means that T2 115 can subsequently carry out further media transfers.

Figure 3:
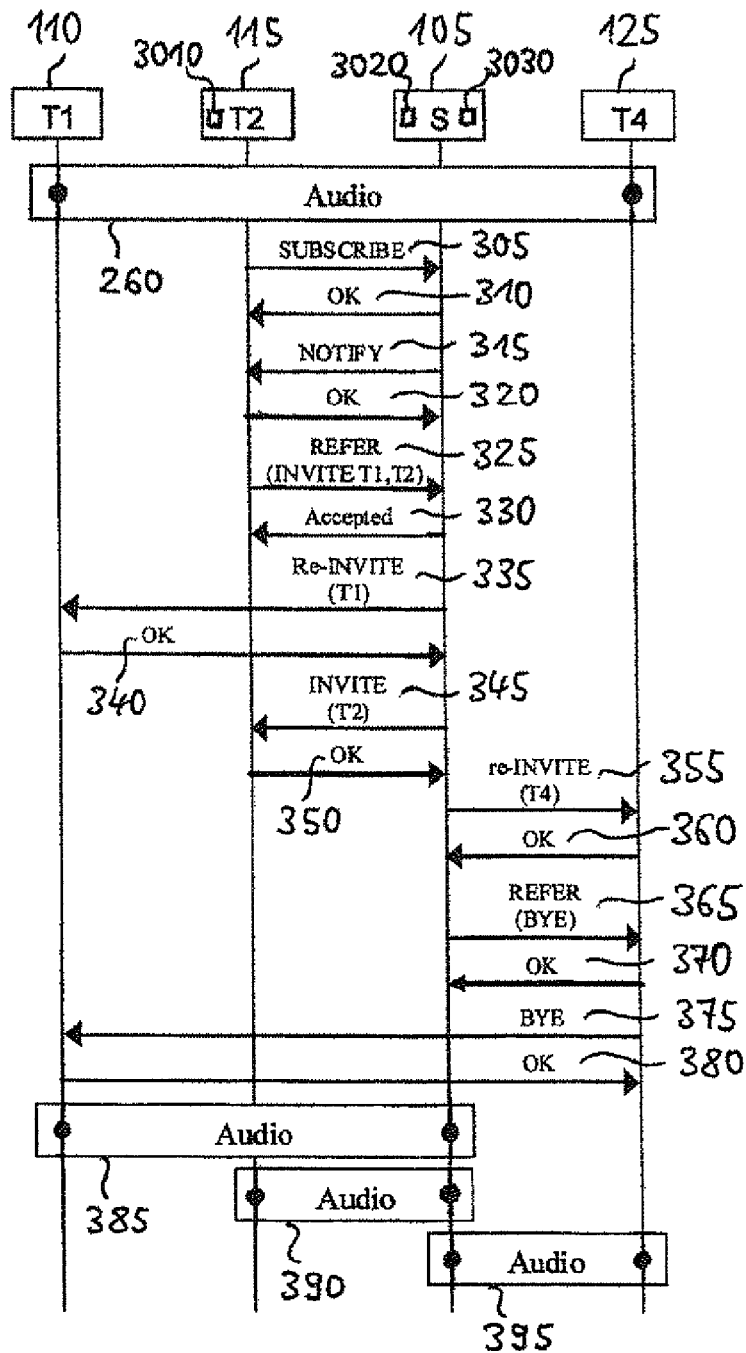
FIG. 3 shows a message flowchart, illustrating the message flow for requesting media replication in a collaborative session, and the message flow for assignment of a communication medium for a collaborative session, according to various embodiments.

FIG. 3 shows a message flowchart, illustrating the message flow for requesting media replication in a collaborative session, and the message flow for assigning a communication medium for a collaborative session according to various embodiments.

This process starts from the situation at the end of the message flowchart in FIG. 2, that is to say a collaborative session exists with an audio connection 260 between T1 110 and T4 125, with T2 115 being assigned the control role for the collaborative session.

The user U1 now wishes to leave his computer. In order to allow his wife to continue to hear the call and to allow him himself to still take part in the call, the user U1 now wishes to replicate the audio connection (the audio medium flow) to his mobile telephone T2 115 (copy, model, replicate), that is to say to initiate media replication of the audio medium in the collaborative session to his mobile telephone T2 115 as a further recipient.

U1 requests the media replication with T2 115 as follows:

T2 115 first of all uses the SIP SUBSCRIBE message 305, which is of the SUBSCRIBE message type, to request information from the IMS server 105 about the collaborative session, including identification information relating to the medium to be transmitted (in this case an audio stream), for example media identifiers, which the server 105 first of all confirms by means of the confirmation message OK 310. The server 105 then sends the SIP NOTIFY message 315, which is of the NOTIFY message type and contains the information relating to the medium to be transmitted, to T2 115. T2 115 uses the confirmation message OK 320 to confirm reception of the message 315.

According to the exemplary embodiment of the invention, T2 115 then sends an SIP REFER message 325 to the IMS server. The SIP REFER message 325 which is sent may appear as shown in the following Table 2 (the table shows only a small number of message fields which are relevant for the explanation in conjunction with various embodiments):

| Request-URI SIP HEADERS | S |
|---|---|
| To: | S |
| From: | T2 |
| Refer-to: | cid:Example-Internet-Address; method=INVITE; Request-URI=<T2>; To=<T2>; From=<T4>; Call-ID=<Example-Call-Identification>; Contact=<T4> |
| Contact: | T2 |
| Content-Type: | application/resource-lists+xml |
| Content-Disposition: | recipient-list |
| Content-Length: | ... |
| Content-ID: | <Example-Internet-Address> |
| BODY | ... <resource-lists> ... <list> <entry uri=T1/> <entry uri=T2/> </list> </resource-lists> |

In this case, S is the SIP address of the IMS server 105, which in this case is stated in the form of an Internet address, that is to say a Uniform Resource Identifier (URI). T1 and T2 are the SIP addresses of the subscriber terminals T1 110 and T2 115, respectively.

The message 325 indicates that the medium which is currently being received by T1 110 (is transmitted to T1) should in future be transmitted both to T1 and to T2 115, that is to say it should in future be additionally transmitted to T2.

The message 325 identifies the audio medium received by T1 110 on the basis of the call identification for the collaborative session, that is to say the indication "Call-ID=<Example-Call-Identification>".

The fact that the message 325 specifies media replication with subsequent reception of the medium both by T1 110 and by T2 115 as well, is evident from the statement "cid: Example-Internet-Address" in the "Refer-to:" field of the message 325. This is because the "Example-Internet-Address" refers to a list in the "BODY", in which both T1 and T2 have been entered.

The server S 105 receives the message 325 and accepts the request for media replication using the ACCEPTED message 330.

The server S 105 matches the media identifiers contained in the received message 325 with the existing audio media stream (audio connection 260), which is used by T1 and T4. The server finds that the audio medium is at the moment being transmitted at the end for the user U1 to T1 110, but should in future also be transmitted to T2 115.

The server assigns the audio medium to T2 115 as an additional recipient for this medium at the end for the user U1. The server S 105 then sets up new media connections, specifically the audio connection 385 between T1 110 and the server S 105 (by means of the messages 335 and 340), the audio connection 390 between T2 115 and the server S 105 (by means of the messages 345 and 350) and the audio connection 395 between T4 125 and the server S 105 (by means of the messages 355 and 360).

Once the new media connections (audio connections 385, 390, 395) have been set up, the server S 105 sends a further SIP REFER message 365 to T4 125, in which T4 uses the reference method BYE (clearance) to request clearance of the direct media connection between T1 110 and T4 125, that is to say the audio connection 260. The SIP REFER message 365 sent by the server may appear as shown in the following Table 3 (the table shows only a few message fields which are relevant for the explanation in conjunction with various embodiments):

| Request-URI SIP HEADERS | T4 |
|---|---|
| To: | T4 |
| From: | S |
| Refer-to: | T1; method=BYE |
| Contact: | S |

In this case, S is the SIP address of the IMS server 105, which is in this case indicated in the form of an Internet address, that is to say a Uniform Resource Identifier (URI). T1 and T4 are the SIP addresses of the subscriber terminals T1 110 and T4 125, respectively.

T4 125 uses the message OK 370 to confirm the request to clear the audio connection 260. The direct media connection between T1 110 and T4 125 is ended with the message BYE 375 (clearance) and OK 380. The server S 105 then receives the audio data from T4 via the audio connection 395, copies it (replicates it), and distributes it via the audio connections 385 and 390 to T1 110 and T2 115.

The terminal T2 115 has a transmitter 3010, which is configured to send the message 325, which specifies that the audio medium for the collaborative communication session at the end for the user U1 is intended to be transmitted not only to T1 110, as in the past, but additionally to T2 115 as well.

The server S 105 has a receiver 3020, which is configured to receive the message 325, and it has an assignment circuit 3030, which is configured to assign the audio medium for the collaborative communication session at the end for the user U1 to the terminal T2 115, which is specified in the message 325 as an additional recipient for the audio medium.

Embodiment 2

Figure 4:
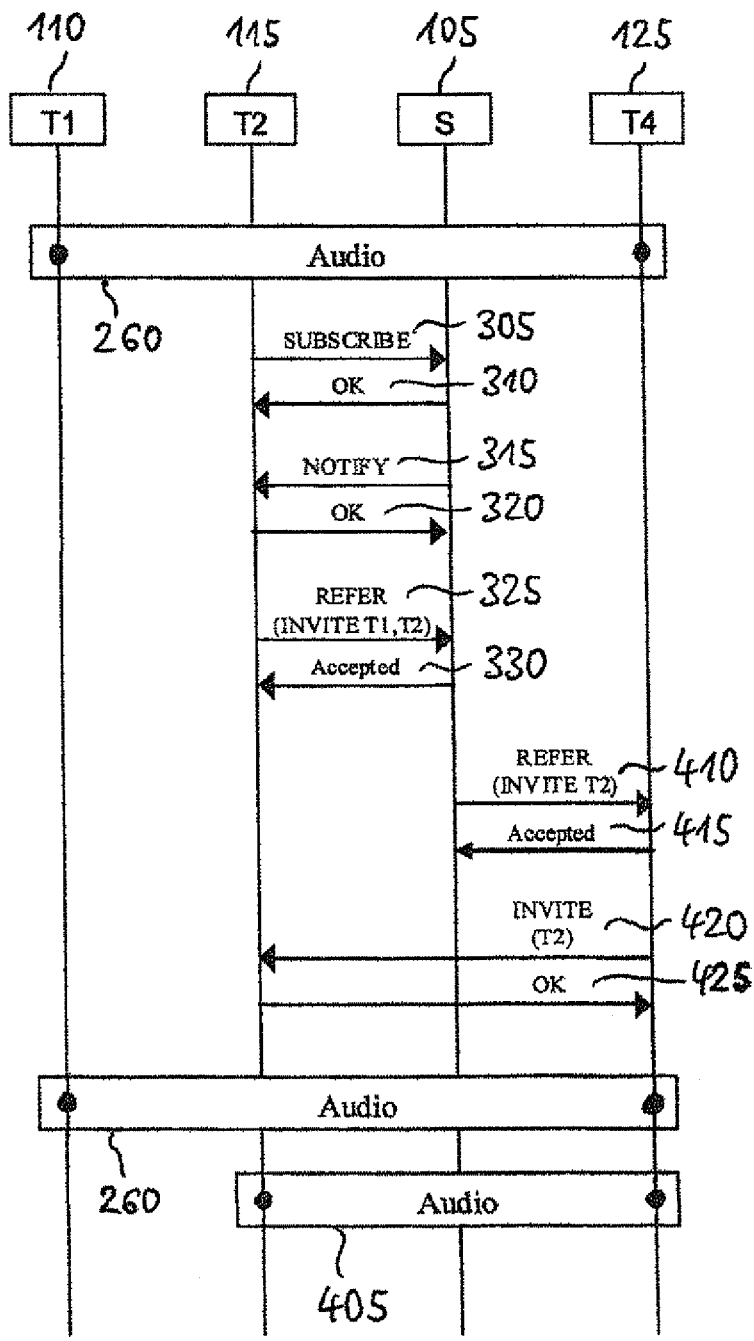
FIG. 4 shows a message flowchart, illustrating the message flow for requesting media replication in a collaborative session, and the message flow for assignment of a communication medium for a collaborative session, according to various embodiments.

FIG. 4 shows a message flowchart, illustrating the message flow for requesting media replication in a collaborative session, and the message flow for assignment of a communication medium for a collaborative session, according to various embodiments.

This example starts from the situation at the end of the message flowchart in FIG. 2. A collaborative session therefore exists with an audio connection 260 between T1 110 and T4 125 (the terminal T1 for the user U1 is communicating with the terminal T4 of the user U2). T2 115 has been assigned the control role for the collaborative session.

As in embodiment 1, the user U1 now wishes to replicate the audio connection (the audio media stream) to his mobile telephone T2 115 (copy, model; replicate), that is to say to replicate the media from the audio medium in the collaborative session to his mobile telephone T2 115 as a further recipient.

The media replication is requested by T2 115, and the server S 105 accepts the request for media replication by means of the messages 305, 310, 315, 320, 325 and 330, in the same manner as in embodiment 1. The messages 305, 310, 315, 320, 325 and 330 have been explained in more detail above during the course of the description relating to FIG. 3.

The SIP REFER message 325 can likewise appear as is shown in Table 2, shown above, and will be explained in more detail with reference to this table.

The server S 105 matches the media identifiers contained in the received message 325 with the existing audio media stream (audio connection 260), which is used by T1 and T4. The server finds that the audio medium at the end for the user U1 is presently being transmitted to T1 110, but in future should also be transmitted to T2 115. The server assigns the audio medium to T2 115 as an additional recipient of this medium at the end for the user U1.

Since the server S 105 has previously (see the description relating to FIG. 2) set up the direct audio connection 260 between T1 110 and T4 125, it knows that this connection already exists. In this exemplary embodiment, the server therefore does not set up a new media connection between T1 and T4 running via the server. In addition, no new media connection running via the server is set up between T2 and T4.

Instead of this, the server S 105 merely sets up a direct new audio connection 405 between T4 125 and T2 115. An SIP REFER message 410, which requests T4 to call T2, is used to request the audio connection 405.

The SIP REFER message 410 that is sent may appear as is shown in the following Table 3 (the table shows only a small number of message fields, which are relevant for the explanation in conjunction with various embodiments):

| Request-URI | T4 |
| --- | --- |
| SIP HEADERS | |
| To: | T4 |
| From: | S |
| Refer-to: | T2; method=INVITE |
| Contact: | S |

In this case, S is the SIP address of the IMS server 105, which is in this case indicated in the form of an Internet address, that is to say a Uniform Resource Identifier (URI). T2 and T4 are the SIP addresses of the subscriber terminals T2 115 and T4 125, respectively.

T4 125 receives the message 410, and accepts the request for the audio connection 405 using the message ACCEPTED 415. T4 125 now invites T2 115 to join the audio communication, using the INVITE message 420, and T2 115 confirms this by means of the confirmation message OK 425.

The two audio connections 260 and 405 then exist in the collaborative communication session. Both T1 110 (as prior to this) and T2 115 (now additionally) receive the audio medium in the collaborative communication session at the end for the user U1.

Further Embodiments

FIG. 5 shows a flowchart 500, illustrating a method for requesting media replication in a collaborative communication session, and a method for assigning a communication medium for a collaborative communication session, according to various embodiments. The embodiments illustrated in FIG. 5 may be combined with all the other described embodiments of the respective method.

First of all, a method will be described for requesting media replication in a collaborative communication session, based on various embodiments.

In 510, a message is sent which specifies that a communication medium for a collaborative communication session, which is currently being transmitted to at least one terminal, should be additionally transmitted to at least one other terminal, with the at least one other terminal being stated in the message as a recipient of the communication medium.

A method will now be described for assigning a communication medium for a collaborative communication session according to one exemplary embodiment of the invention:

In 520, a message is received which specifies that a communication medium for a collaborative communication session, which is currently being transmitted to at least one terminal, should additionally be transmitted to at least one other terminal, with the at least one other terminal being indicated as a recipient of the communication medium in the message.

In 530, the communication medium is assigned to the at least one other terminal as a recipient of the communication medium.

In the overall analysis, 510, 520 and 530 indicate the interaction of the method for requesting media replication in a collaborative communication session and the method for assignment of a communication medium for a collaborative communication session at the system level or overall network level.

Various embodiments may also be used for collaborative sessions which include the terminals of a plurality of users, that is to say in which a plurality of users with a plurality of terminals form one of the communication ends.

Various embodiments may also be used for requests for media replications by controlled terminals, that is to say non-controlling terminals. In this case, the message which requests media replication is not sent by a controlling terminal, that is to say by a holder of the control role for the collaborative communication session, but by a terminal which does not, or does not at the moment, have the control role for the collaborative communication session. This makes it possible to control a collaborative session in a particularly flexible manner.

According to various embodiments, in the situation in which a non-controlling (controlled) terminal requests media replication, it is possible to assign the requesting non-controlling terminal a control role for the collaborative communication session, or to automatically assign this. Alternatively, the requesting terminal can remain a controlled terminal. If the requesting terminal is assigned a control role, it is also possible for already existing controlling terminals to remain in this role. Alternatively, it is also possible for already existing controlling terminals to lose their control roles, that is to say they become terminals to be controlled (control role transfer).

According to various embodiments, it is possible for a server in the communication system to authorize media replication which is requested by a controlled terminal. For example, this can be authorized by existing controlling terminals being asked for authorization permission. The controlling terminals can then ask their users for permission.

According to various embodiments, instead of a list with the respective SIP-URI of the respective media recipients, a reference to an external SIP-URI list may be contained in the SIP REFER message, in the case of an SIP-REFER message for requesting media replication.

According to various embodiments, media can be identified by SDP marking attributes. In this case, the server matches existing media (media connections, media streams) with the received SDP marking attributes.

Various embodiments may be used to replicate media at more than two destination terminals (copying). In this case, the recipient list for the replication request may contain more than two SIP-URIs.

Various embodiments may also be used when a communication control protocol other than SIP is being used, and/or when a communication system other than IMS is being used.

In a method for requesting media replication in a collaborative communication session, a message is sent which specifies that a communication medium for a collaborative communication session, which is currently being transmitted to at least one terminal, should additionally be transmitted to at least one other terminal, with the at least one other terminal being indicated in the message as the recipient of the communication medium.

Media replication may also be described by the terms media copying, media modeling or media copy.

An apparatus for requesting media replication in a collaborative communication session has a transmitter which is configured to send a message which specifies that a communication medium in a collaborative communication session, which is currently being transmitted to at least one terminal, should additionally be transmitted to at least one other terminal, with the at least one other terminal being indicated in the message as the recipient of the communication medium.

In a method for assigning a communication medium for a collaborative communication session, a message is received which specifies that a communication medium for a collaborative communication session, which is currently being transmitted to at least one terminal, should additionally be transmitted to at least one other terminal, with the at least one other terminal being indicated in the message as the recipient of the communication medium, and the communication medium is assigned to the at least one other terminal as the recipient of the communication medium.

An apparatus for assigning a communication medium for a collaborative communication session has a receiver which is configured to receive a message which specifies that a communication medium for a collaborative communication session, which is currently being transmitted to at least one terminal, should additionally be transmitted to at least one other terminal, with the at least one other terminal being indicated in the message as the recipient of the communication medium, and it has an assignment circuit, which is designed for assignment of the communication medium to the at least one other terminal as the recipient of the communication medium.

Various embodiments include requesting the media replication by means of a message which specifies a plurality of receivers.

Various embodiments may have the effect that it allows media to be replicated to a plurality of appliances in a given collaborative communication session, as well as an IMS collaborative session, thus allowing a specific medium no longer to be received only by a single appliance, which is involved in the collaborative session, but by a plurality of appliances in the collaborative session.

Only one terminal in a collaborative session can receive a medium which is received in the course of the collaborative session. Various embodiments make it possible to distribute media received in the course of a collaborative session in a more flexible manner between the terminals involved in the collaborative session.

One effect of various embodiments may clearly be considered to be that of allowing media to be copied in the collaborative communication session, as a result of which the relevant media are received by a plurality of terminals involved in the collaborative communication session.

Where applicable, the explanations relating to the methods also relate in the same sense to the apparatuses, and vice versa.

In various embodiments, the message is sent by a terminal.

In various embodiments, the message is sent by a terminal which is currently not assigned a control role for the collaborative communication session.

In various embodiments, the message is received by a server in a communication system, and the communication medium is assigned by a server in the communication system.

In various embodiments, the communication medium is copied by a server in the communication system, and the copied communication medium is distributed to the at least one terminal and the at least one other terminal by a server in the communication system.

In various embodiments, a server in the communication system produces a direct media connection, which is suitable for transmission of the communication medium, between the at least one other terminal as the recipient of the communication medium and a terminal which sends the communication medium.

In various embodiments, the at least one other terminal includes a plurality of terminals, that is to say a plurality of other terminals may occur instead of at least one other terminal, for example two, three, four, five or even more other terminals. The message relating to media replication includes a plurality of other terminals, that is to say it states a plurality of terminals which occur instead of the at least one other terminal, for example two, three, four, five or even more other terminals. This may have the effect that media replication can be requested by means of a single message at more than one additional recipient, specifically for example two or more additional receiving terminals, that is to say a total of more than two terminals that receive the medium. This may save signaling complexity.

In various embodiments, the message indicates the at least one terminal as the recipient of the communication medium.

In various embodiments, the message is formed on the basis of the Session Initiation Protocol (SIP), and its message type REFER. In various embodiments, the media replication may be requested by means of an SIP-REFER message which specifies a plurality of recipients.

In various embodiments, the SIP-REFER message specifies all the receivers for which reception of the medium or of the media is requested.

In various embodiments, the media to be copied may be identified in an SIP-REFER message with which media replication is requested, for example by means of media identifiers, for example the call identification (call-ID) of the communication session associated with the media, a header field (to-header) which indicates an addressee of the message, a header field (from-header) which indicates a sender of the message, and/or a description based on the Session Description Protocol (SDP). In an SIP message, media may be described in accordance with the SDP in the message body of the SIP message. According to SDP, media can be marked by means of an SDP marking attribute (label attribute), and can thus be identified.

In various embodiments, an SIP-REFER request is sent to a server in the communication system. A server in the communication system matches existing media (media connections, media flows) to the received media identifiers, for example received SDP marking attributes, and sets up appropriate media connections to all the requested recipients. A server in the communication system then receives and copies the media, and distributes them to the recipients. Media replication by means of a server in the communication system may have the advantage that, in the case of those terminals which send the media, transmission bandwidth is saved in comparison to the situation in which they had to send multiple copies of the media, thus saving transmission bandwidth overall in the communication system.

In various embodiments, a server in the communication system sets up direct media connections between the terminals involved, that is to say in each case between the sending terminal and the various terminals which receive the medium. In this case, the medium is copied by the sending terminal.

In various embodiments, the apparatus for requesting media replication is furthermore configured to carry out the method according to one of the exemplary embodiments which relate to the method for requesting media replication.

In various embodiments, the apparatus for assignment of a communication medium is furthermore configured to carry out the method according to one of the exemplary embodiments which relate to the method for assigning a communication medium.

In various embodiments, the terminal which sends the message is designed for access to a communication system, and the message is sent to a server in the communication system.

In various embodiments, the communication system is a communication system designed in accordance with the Internet Protocol Multimedia Subsystem (IMS) to the 3GPP mobile radio standard.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for requesting media replication in a collaborative communication session, the method comprising:
sending a message from a terminal, which specifies that a communication medium for a collaborative communication session, which is currently being transmitted to at least one terminal, should additionally be transmitted to at least one other terminal, with the at least one other terminal being indicated in the message as the recipient of the communication medium, wherein the message is sent by a terminal which is currently not assigned a control role for the collaborative communication session; wherein the method further comprises:
setting up a direct media connection, which is suitable for transmission of the communication medium, between the at least one other terminal as the recipient of the communication medium and a terminal which sends the communication medium.

2. The method as claimed in claim 1,
wherein the at least one other terminal includes a plurality of terminals.

3. The method as claimed in claim 1,
wherein the message indicates the at least one terminal as the recipient of the communication medium.

4. The method as claimed in claim 1,
wherein the message is formed on the basis of the Session Initiation Protocol (SIP), and its message type REFER.

5. A method for assigning a communication medium for a collaborative communication session, the method comprising:
receiving a message which specifies that a communication medium for a collaborative communication session, which is currently being transmitted to at least one terminal, should additionally be transmitted to at least one other terminal, with the at least one other terminal being indicated in the message as the recipient of the communication medium, wherein the message is sent by a terminal which is currently not assigned a control role for the collaborative communication session; wherein the method further comprising: setting up a direct media connection, which is suitable for transmission of the communication medium, between the at least one other terminal as the recipient of the communication medium and a terminal which sends the communication medium; and assigning the communication medium to the at least one other terminal as the recipient of the communication medium.

6. The method as claimed in claim 5,
wherein the message is received by a server in a communication system, and the communication medium is assigned by a server in the communication system.

7. The method as claimed in claim 6, further comprising:
copying the communication medium by a server in the communication system; and
distributing the copied communication medium to the at least one terminal and to the at least one other terminal by a server in the communication system.

8. The method as claimed in claim 5,
wherein the at least one other terminal includes a plurality of terminals.

9. The method as claimed in claim 5,
wherein the message indicates the at least one terminal as the recipient of the communication medium.

10. The method as claimed in claim 5,
wherein the message is formed on the basis of the Session Initiation Protocol (SIP), and its message type REFER.

11. An apparatus for requesting media replication in a collaborative communication session, the apparatus comprising:
a transmitter configured to send a message which specifies that a communication medium in a collaborative communication session, which is currently being transmitted to at least one terminal, should additionally be transmitted to at least one other terminal, with the at least one other terminal, being indicated in the message as the recipient of the communication medium, wherein the transmitter is configured to send the message when the apparatus is not currently assigned a control role for the collaborative communication session; and a controller configured to set up a direct media connection, which is suitable for transmission of the communication medium, between the at least one other terminal as the recipient of the communication medium and a terminal which sends the communication medium.

12. The apparatus as claimed in claim 11,
furthermore configured to carry out a method for requesting media replication in a collaborative communication session, the method comprising: sending a message which specifies that a communication medium for a collaborative communication session, which is currently being transmitted to at least one terminal, should additionally be transmitted to at least one other terminal, with the at least one other terminal being indicated in the message as the recipient of the communication medium.

13. An apparatus for assigning a communication medium for a collaborative communication session, the apparatus comprising:
a receiver configured to receive a message which specifies that a communication medium for a collaborative communication session, which is currently being transmitted to at least one terminal, should additionally be transmitted to at least one other terminal, with the at least one other terminal being indicated in the message as the recipient of the communication medium, wherein the message is sent by a terminal which is currently not assigned a control role for the collaborative communication session; and an assignment circuit configured to assign the communication medium to the at least one other terminal as the recipient of the communication medium-; and a controller configured to set up a direct media connection, which is suitable for transmission of the communication medium, between the at least one other terminal as the recipient of the communication medium and a terminal which sends the communication medium.

14. The apparatus as claimed in claim 13, furthermore configured to carry out a method for assigning a communication medium for a collaborative communication session, the method comprising: receiving a message which specifies that a communication medium for a collaborative communication session, which is currently being transmitted to at least one terminal, should additionally be transmitted to at least one other terminal, with the at least one other terminal being indicated in the message as the recipient of the communication medium; and assigning the communication medium to the at least one other terminal as the recipient of the communication medium.

* * * * *

UNITED STATES PATENT AND TRADEMARK OFFICE
CERTIFICATE OF CORRECTION

PATENT NO. : 8,832,189 B2
APPLICATION NO. : 13/117213
DATED : September 9, 2014
INVENTOR(S) : Frank Kowalewski It is certified that error appears in the above-identified patent and that said Letters Patent is hereby corrected as shown below:

In the Claims

Column 13, line 8 (Claim 13, line 8):  Replace "medium-; and" with --medium; and--.

Signed and Sealed this
Fifth Day of April, 2016

Michelle K. Lee
*Director of the United States Patent and Trademark Office*